United States Patent [19]

Glazier et al.

[11] Patent Number: 5,579,894
[45] Date of Patent: Dec. 3, 1996

[54] DIRECT DROP TRANSFER APPARATUS

[75] Inventors: James A. Glazier, Hamilton; Frank G. Oliverio, Cincinnati, both of Ohio

[73] Assignee: R. A. Jones & Co. Inc., Crescent Springs, Ky.

[21] Appl. No.: 420,108

[22] Filed: Apr. 11, 1995

[51] Int. Cl.⁶ ................................................. B65G 57/32
[52] U.S. Cl. .................. 198/431; 198/549; 198/631.1; 414/790.4
[58] Field of Search ................... 198/431, 631.1, 198/710, 712, 792; 414/790.4, 786

[56] References Cited

U.S. PATENT DOCUMENTS

| | | | |
|---|---|---|---|
| 2,373,076 | 4/1945 | Engels | 198/603 X |
| 3,225,716 | 12/1965 | Krooss et al. | 198/402 X |
| 3,597,898 | 8/1971 | Cloud | 53/29 |
| 3,822,008 | 7/1974 | Benner, Jr. et al. | |
| 3,961,697 | 6/1976 | Hartman et al. | |
| 4,399,905 | 8/1983 | Lance et al. | 198/422 |
| 4,577,453 | 3/1986 | Hofeler | 53/438 |
| 4,585,113 | 4/1986 | Greenwell | 198/347 |
| 4,802,570 | 2/1989 | Hirsch et al. | 414/790 |
| 5,018,334 | 5/1991 | Guttinger et al. | 53/152 |
| 5,040,663 | 8/1991 | Gould et al. | 198/419.3 |
| 5,220,993 | 6/1993 | Scarpa et al. | 198/431 |
| 5,261,522 | 11/1993 | Guttinger et al. | 198/429 |
| 5,331,790 | 7/1994 | Benner, Jr. et al. | 53/437 |

FOREIGN PATENT DOCUMENTS

| | | |
|---|---|---|
| 3708604 | 9/1988 | Denmark . |
| 3724839 | 2/1989 | Denmark . |
| 0292378 | 11/1988 | European Pat. Off. . |
| 0501382 | 9/1992 | European Pat. Off. . |
| 0509624 | 10/1992 | European Pat. Off. . |
| 0509583 | 10/1992 | European Pat. Off. . |
| 3736868 | 5/1989 | Germany ........................ 414/790.4 |

*Primary Examiner*—Karen B. Merritt
*Assistant Examiner*—Janice L. Krizek
*Attorney, Agent, or Firm*—Wood, Herron & Evans, PLL

[57] ABSTRACT

A product transfer apparatus for transferring individual product from a rotary feeding station to downstream apparatus such as a cartoner conveyor in preselected count stacks for subsequent discharge at a cartoner machine. Stacks of product are formed by dropping the product into stacks on a transfer conveyor and from there dropping the stacks directly into buckets of a cartoner conveyor. A transfer bucket conveyor is disposed beneath and transverse to an axis of the rotary feeding station and includes an upper fill run and a lower discharge run of product transfer buckets. The cartoner conveyor is disposed beneath and aligned with the transfer bucket conveyor and includes a series of cartoner product buckets operating in speed register with the lower run of product transfer buckets for receiving the preselected count stacks from the lower discharge run. The transfer bucket conveyor is capable of intermittent or decreased speed in the upper fill run for accommodating stack building, rejection of the product, varied product sizes, varying counts of the product in the upper fill run, a varied bucket pitch, while maintaining a constant speed in the lower discharge run for continuously feeding product stacks to the cartoner product buckets. Any combination of continuous and intermittent motion in the upper and lower transfer runs can be used for desired effect, including synchronization between varied upstream and downstream product handling stations.

24 Claims, 10 Drawing Sheets

DIRECT DROP TRANSFER APPARATUS

BACKGROUND OF THE INVENTION

This invention relates generally to product handling and has a particular but by no means exclusive relation to apparatus for transferring filled, cut-off pouches between the rotary knife of a pouch form, fill and seal machine and a cartoner where preselected count stacks of pouches are fed to the cartoner for subsequent cartoning.

In pouch machines of the known art, such as disclosed in U.S. Pat. No. 3,597,898 which is herewith incorporated herein by reference, a flat web of heat sealable material is continuously fed from upstream of the pouch machine to be longitudinally folded upon itself by a plow or similar device. In this form, the thus-folded web is fed about a sealer which contacts the folded web along vertical heated land areas to form transverse vertical seals and, thus, a series of open pouches along the web. In this way, the web of open pouches is passed around a filler wheel, filled with product and then sealed along the top edge of the web. The web of filled pouches then passes downstream to a motor-driven rotary knife apparatus which cuts the web along the transverse vertical seals into separate individual pouches for subsequent cartoning at a cartoner machine.

In a typical cartoning operation of the known art, conveyors are used to transfer individually cut pouches from the rotary knife to a cartoner machine. If the pouches are required to be stacked in preselected counts prior to being delivered to the cartoner, additional transfer conveyors and stacking apparatus must be operatively placed between the rotary knife and the cartoner machine to count, stack and move the pouches prior to cartoning.

Before the present invention was made, various transfer apparatus to facilitate transfer of pouches from a rotary knife to a cartoning machine have been disclosed. One such apparatus, disclosed in Hartman et al., U.S. Pat. No. 3,961,697, deposits individually cut pouches in shingled fashion from a rotary knife onto a moving product transfer conveyor. This moving train of shingled pouches is then further deposited into a chute where an operator manually counts, divides and inserts the pouches into boxes. An improved transfer apparatus is further disclosed in Scarpa et al., U.S. Pat. No. 5,220,993, wherein a transfer wheel with radially extending suction cups is positioned intermediate the rotary knife and the product transfer conveyor for picking cut pouches off the rotary knife and depositing the pouches in a series of spaced lanes on the product transfer conveyor for subsequent stacking and cartoning.

The known cartoner machines generally have a set operation whereby the product transfer conveyor delivering pouches to the cartoner must operate in a timed relationship with the cartoner for proper transfer of the pouches. However, it is not uncommon to reject or discard pouches at the rotary knife station because, for example, the pouches never received appropriate fill of product at the filler wheel, were mis-sealed or mis-cut. In transfer operations of the known art, the product transfer conveyor cannot be intermittently stopped to accommodate for the discarded pouches without simultaneously stopping the cartoner machine. Rather, adjustments must be made either at the stacker or cartoner to maintain the proper pouch count while at the same time stopping the transfer operation.

It will be appreciated that it is desirable to reduce the number of pouch transfer operations occurring between the rotary knife and the cartoner machine. In one respect, reducing the number of pouch transfers makes the overall cartoning operation more reliable. The fewer times a pouch is handled, the less chance there is for a malfunction or jam. In another, and equally important respect, floor space could be saved and economies could result by the reduction or elimination of transfer operations and apparatus currently required for the pouch transfer.

Accordingly, it has been a primary objective of the present invention to improve the transfer of cut pouches from the rotary knife station to the cartoner.

Another objective of the invention has been to provide an improved transfer apparatus for transferring individual product or pouches from a rotary feeding station to cartoner product buckets in preselected count stacks for subsequent discharge at a cartoner machine.

Another objective of the present invention has been to provide a transfer apparatus which can accommodate product or pouch flow variations without requiring stoppage of the downstream cartoner or upstream product feed.

SUMMARY OF THE INVENTION

To these ends, one embodiment of the present invention includes a direct drop transfer apparatus having an endless transfer bucket conveyor disposed beneath and transverse to an axis of a rotary feeding station. Pouches are dropped onto the transfer conveyor to form stacks and these stacks are, in turn, dropped directly into buckets of a bucket conveyor of a cartoner. The transfer bucket conveyor is capable of intermittent or decreased speed in an upper fill run for receiving product in stacks while maintaining a constant speed through a lower discharge run for discharging product stacks into a cartoner bucket conveyor.

The rotary feeding station comprises any suitable product drop-off apparatus, such as, for example, the transfer wheel apparatus disclosed in Scarpa et al., U.S. Pat. No. 5,220,993, the knife apparatus disclosed in U.S. Pat. No. 3,961,697, or the knife apparatus disclosed in co-pending application Ser. No. 08/338,840 filed on Nov. 14, 1994, entitled "Variable Count Direct Deposit Knife," by inventor P. Dieterlen, which application is herewith expressly incorporated herein by reference. The rotary knife of that invention has a series of suction cups circumferentially spaced about a knife hub for holding and subsequently ejecting cut pouches at different predetermined angular drop-off points of the knife hub.

In one embodiment of the present invention, the transfer bucket conveyor includes a series of slotted product transfer buckets for receiving preselected count stacks of pouches directly from the rotary knife as an upper fill run of the transfer bucket conveyor travels in a timed relationship with the rotary knife. A cartoner bucket conveyor is disposed beneath and aligned with a lower discharge run of the transfer bucket conveyor and includes a series of slotted cartoner product buckets for receiving the preselected count stacks of pouches directly from the lower discharge run of product transfer buckets for subsequent discharge at a cartoner machine.

To accommodate for rejected pouches at the rotary knife, or for varying counts of the pouches in the product transfer buckets, the transfer bucket conveyor is laterally moveable relative to the rotary knife and the cartoner bucket conveyor. It will be appreciated that this lateral movement provides spatial dwell-and-go motion of the transfer bucket conveyor upper fill run beneath the rotary knife for varying the timed relationship between the upper fill run and the rotary knife.

The transfer bucket conveyor is preferably driven by an endless drive belt and includes the upper and lower runs of product transfer buckets connected to a pair of endless chains. The preselected count stacks of pouches are retained in the product transfer buckets by arcuate turnover guides as the product transfer buckets move from the upper fill run to the lower discharge run. In one embodiment, the upper and lower runs of product transfer buckets are driven by separate motor-driven driving pulleys which are fixed relative to the laterally moveable transfer bucket conveyor. Alternatively, the lower run driving pulley is driven by a power take off from the cartoner bucket conveyor.

The cartoner bucket conveyor is driven by an endless drive belt and includes upper and lower runs of the cartoner product buckets connected to a pair of endless chains. The cartoner bucket conveyor is driven by a separate motor-driven driving pulley such that the lower discharge run of product transfer buckets travels at the same rate and in the same direction as the upper run of cartoner product buckets. In this way, the preselected count stacks of pouches are continuously transferred from the product transfer buckets to the cartoner product buckets via angled ramp bars while permitting intermittent spatial dwell-and-go motion of the upper fill run of product transfer buckets to receive a desired pouch count from the rotary knife, The spatial dwell-and-go motion of the transfer bucket conveyor upper fill run is accommodated by the combination of selectively overdriving or underdriving the upper fill run of the transfer bucket conveyor relative to the lower discharge run and by a coordinated take-up apparatus. In a preferred embodiment, the transfer bucket conveyor includes first and second sprockets mounted on respective first and second shafts. The first and second shafts are further connected to each other by a floating carriage for maintaining a spatial distance between the sprockets. As the upper and lower runs of the product transfer buckets are overdriven and underdriven relative to each other, the entire transfer bucket conveyor, mounted on the floating carriage, moves in laterally opposite directions to provide the spatial dwell-and-go motion of the upper fill run beneath the rotary knife, while maintaining the lower discharge run at a constant velocity matched to the cartoner bucket conveyor.

In this way, the spatial dwell-and-go motion of the transfer bucket conveyor upper fill run allows the product transfer buckets to be intermittently paused beneath the rotary knife to accommodate for rejected pouches or for varying pouch counts while maintaining continuous, constant rate feeding of the cartoner product buckets and the cartoner machine with product from the rotary knife.

It will be appreciated that the invention has many functional and operational advantages. For example only, either the top run or the bottom run of the transfer conveyor can be run intermittently to accommodate filling or discharge variations or requirements, upstream or downstream operational variations, erratic product delivery, missing products, or the like. A random product in feed can be synchronized with a constant speed cartoner for either single or multiple count product groups. An intermittent or variable speed cartoner can be accommodated and filled from either a continuous or an intermittent in feed device.

Moreover, it will be appreciated that the invention provides the capacity to match varying width pouches or product to varying pitch buckets or conveyor target locations on a cartoner, for example. For example, the pitch of buckets on the transfer conveyor could be adjusted as desired and the speed of the bottom run of the transfer conveyor changed to accommodate the pitch change in order to satisfy the cartoner speed.

It will also be appreciated that while the invention has been and will be described in certain embodiments particularly suitable for handling pouches, the invention has wide ranging application in the transfer of products of many types, sizes and shapes, other than pouches and thus is not limited to pouches per se. It is not, for example, necessary to have the transfer conveyor feed a cartoner. Instead, it may be used to feed pouches or products to any number of product handling conveyors or devices other than cartoners.

Also, it will be appreciated that the invention provides a much smaller "foot print", i.e., requires much less floor space than prior transfer apparatus. Thus, the floor space requirement for product transfers is reduced and operators can more easily move around and gain access to the transfer and its components.

BRIEF DESCRIPTION OF THE DRAWINGS

These and other modifications and advantages will become even more readily apparent from the following detailed description of a preferred embodiment of the invention, and from the drawings in which.

DETAILED DESCRIPTION OF THE INVENTION

Figure 1:
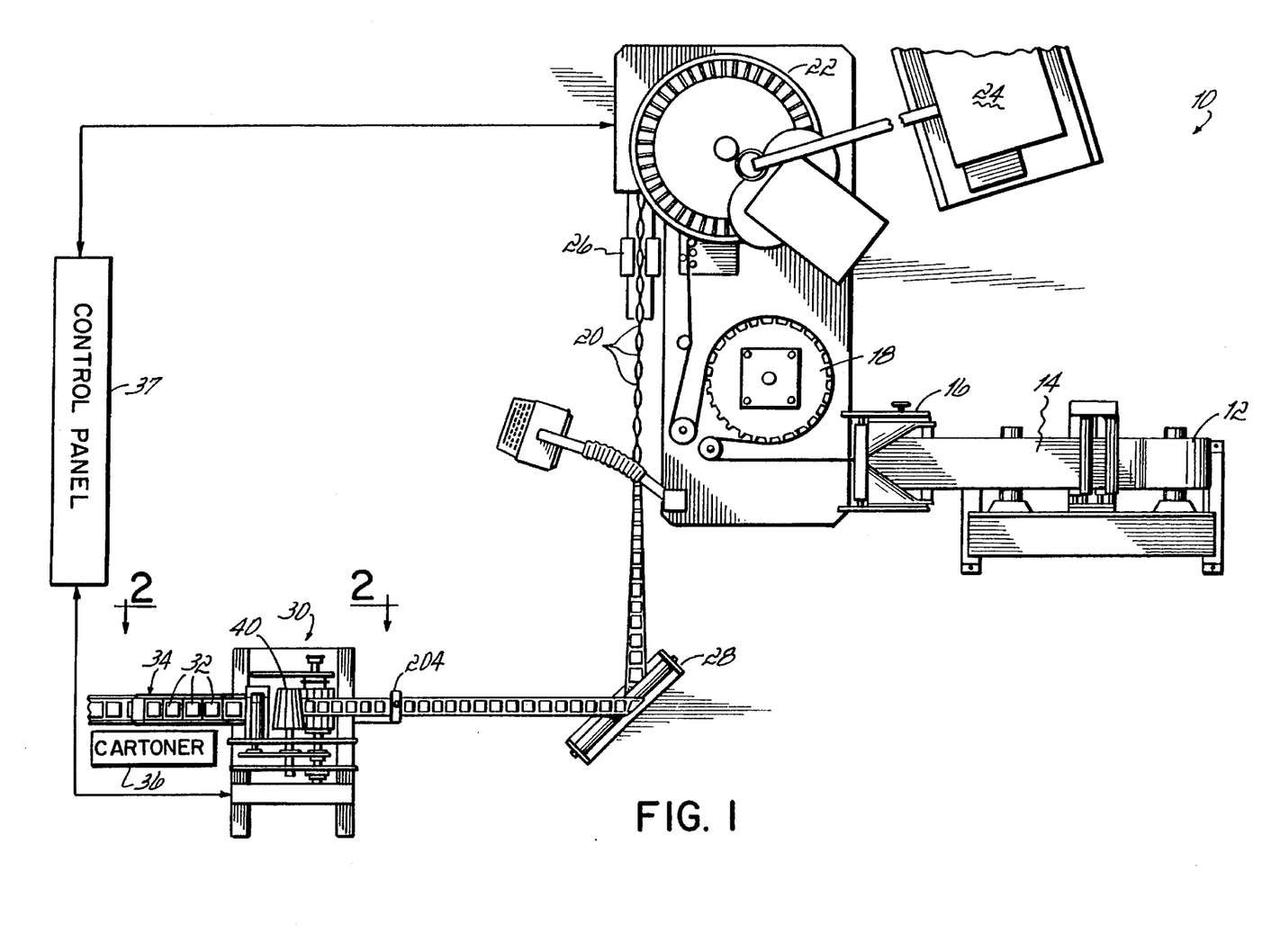
FIG. 1 is a diagrammatic plan view of a pouch form, fill and seal operation in which the present invention is used.

With reference to FIG. 1, a pouch form, fill and seal machine 10 is shown having a web supply 12 feeding a flat web 14 of heat-sealable material through plow 16 to be longitudinally folded upon itself. The thus-folded web is passed about a vertical sealer 18 having vertically extending heated sealing surfaces which contact the folded web along discrete areas to form transverse seals 20. In this way, open-ended pouches are formed along the web between the transverse seals 20 and are passed around a filler wheel 22 to be filled with product fed from a product feeding station 24. The train of filled open-ended pouches then passes through an upper edge sealer 26 which seals the pouches along respective open ends between the transverse seals 20. In one embodiment, the web of filled and sealed pouches is rotated 90 degrees through turning bar 28 and passed through a rotary knife apparatus 30 wherein the web of pouches is cut along the transverse seals 20 into individual pouches 32.

In accordance with the present invention, the individual pouches 32 are directly deposited from the knife 30 into preselected count stacks on a direct drop transfer apparatus 34 disposed beneath the rotary knife apparatus 30 for subsequent cartoning at a cartoner machine 36. It will be appreciated that direct drop transfer apparatus 34 is provided such that no intervening transfers, counters, or pouch stackers are required prior to cartoning the preselected count stacks formed by this invention.

Operation of the pouch form, fill and seal machine 10, the rotary knife apparatus 30 and the direct drop transfer apparatus 34 is controlled via a control panel 37 which receives and generates appropriate control signals as will be described in more detail below. It will be appreciated that control panel 37 includes controllers understood by those skilled in the art for operation of the machine 10, rotary knife apparatus 30 and direct drop transfer apparatus 34.

Figure 2:
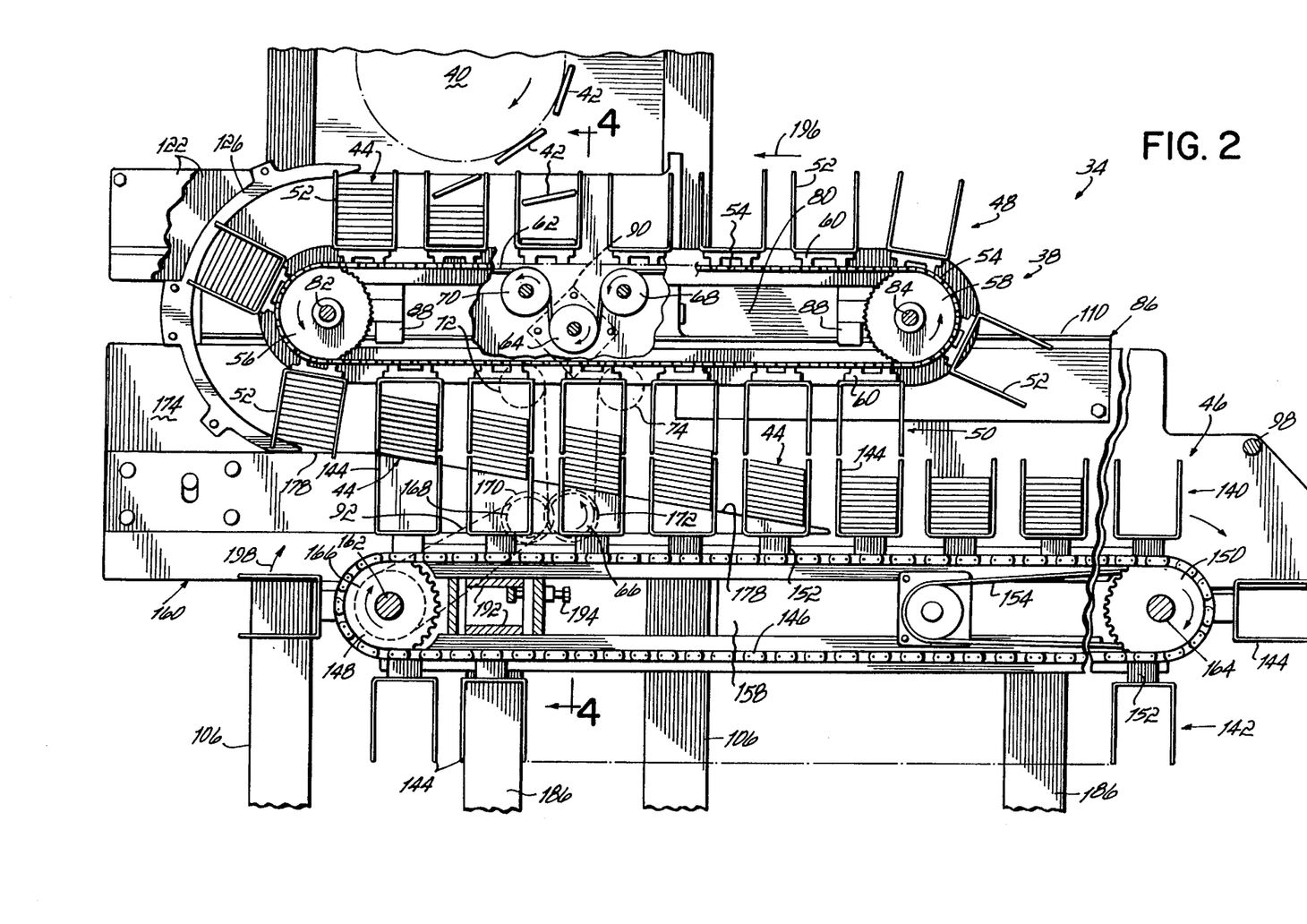
FIG. 2 is a partially schematic side elevational view of the present invention taken generally along line 2—2 of FIG. 1 showing the transfer bucket conveyor shifted laterally in one direction, such as to the left as shown in the figure.

The direct drop transfer apparatus 34 is the focus of the present invention and includes, as shown in FIG. 2, a transfer bucket conveyor 38 disposed beneath and transverse to an axis of a product feeding station 40 (preferably a rotary feeding station) for receiving individual product 42 from the rotary feeding station 40 in preselected count stacks 44 as will be described in more detail below. It will be appreciated that rotary feeding station 40 could be, for example, the rotary knife 30 of FIG. 1 depositing or dropping individual pouches 32, or a transfer wheel (not shown) depositing overwrapped product, such as pharmaceutical blister packs, snack bars or the like or some other feeding device of any suitable configuration. A cartoner bucket conveyor 46 is disposed beneath and aligned with the transfer bucket conveyor 38 such that the individual product 42 is transferred from the transfer bucket conveyor 38 directly to the cartoner bucket conveyor 46 in the preselected count stacks 44 for subsequent cartoning at the cartoner machine 36 (see FIG. 1).

Transfer bucket conveyor 38 includes an upper fill run 48 and a lower discharge run 50 of slotted product transfer buckets 52 fixed to and disposed about a pair of endless chains 54 driven by endstocks or sprockets 56 and 58. The product transfer buckets 52 are attached to the pair of endless chains 54 via bucket mounting brackets 60 which mate with lugs (not shown) extending from the pair of endless chains 54 such that the product transfer buckets 52 can be configured to match feeding operation of the cartoner machine 36. For example, in one embodiment the product transfer buckets 52 are individually spaced on 6" centers about the pair of endless chains 54 as shown in FIGS. 2, 2A and 7A–7G. In another embodiment, and with reference to FIGS. 10A–10D of co-pending application Ser. No. 08/338, 840, fully incorporated herein by reference, the buckets 52 are grouped in pairs (shown as buckets 186 in FIGS. 10A–10D of the co-pending application) and spaced on 12" centers between adjacent bucket pairs about the chains 54.

Figure 3:
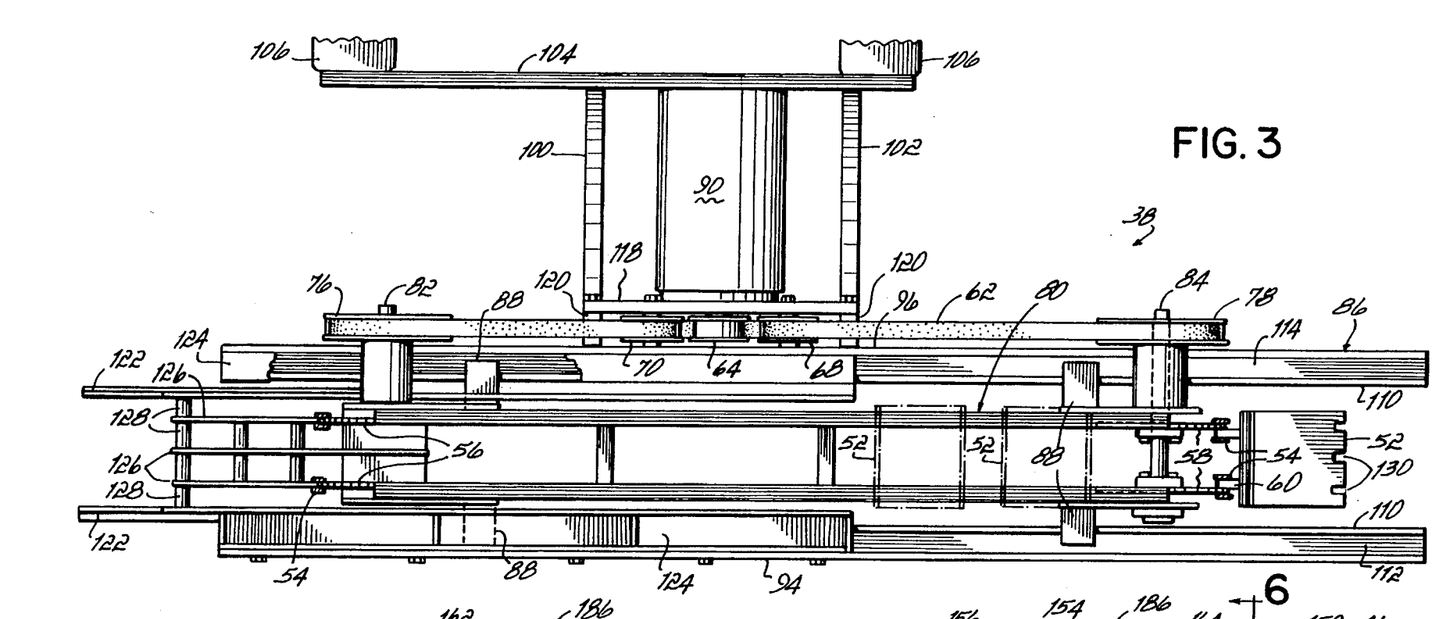
FIG. 3 is a top view of the transfer bucket conveyor.
Figure 4:
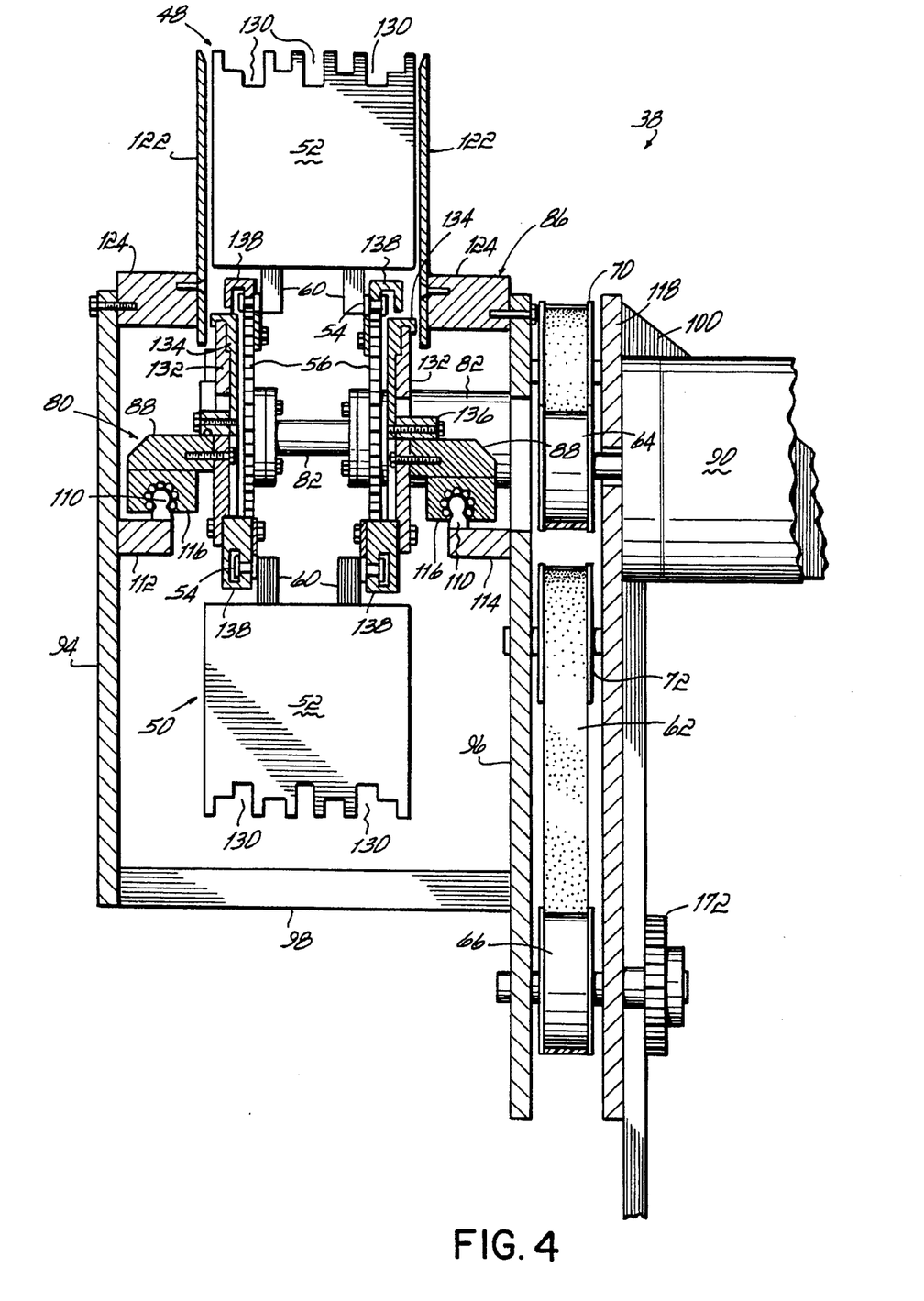
FIG. 4 is a cross-sectional view of the transfer bucket conveyor taken generally along line 4—4 of FIG. 2.

Endstocks or sprockets 56 and 58 are driven by an endless drive belt 62 which travels in a counterclockwise direction about fixed driving pulleys 64 and 66, fixed idler pulleys 68, 70, 72 and 74, and sprocket pulleys 76 and 78 (see FIG. 3). Sprockets 56 and 58, and sprocket pulleys 76 and 78, are attached to a laterally moveable or floating carriage 80 via respective carriage shafts 82 and 84, as best shown in FIGS. 3 and 4. In this way, spatial distance between carriage shafts 82 and 84 is maintained during operation of the transfer bucket conveyor 38. In accordance with the present invention, floating carriage 80, including sprockets 56 and 58, and respective sprocket pulleys 76 and 78, rides on a rigid support frame 86 via slide brackets 88 as will be described in more detail below. In one embodiment, fixed driving pulley 64 is driven by a servo-motor 90 while fixed driving pulley 66 is driven by a power take-off 92 from the cartoner bucket conveyor 46. It will be appreciated that driving pulley 66 could alternatively be driven by a separate fixed servo-motor (not shown).

Referring to FIGS. 3 and 4, the transfer bucket conveyor 38 includes the floating carriage 80 mounted between a front frame plate 94 and a rear frame plate 96. Front and rear frame plates 94 and 96, respectively, are joined by tie shafts 98 (one shown). Mounting brackets 100 and 102 are provided to attach the rear frame plate 96 to a support bracket 104 attached to support legs 106. Floating carriage 80 is mounted on the slide brackets 88 which ride on slide rails 110 fixed to the front and rear frame plates 94 and 96 via slide mount bars 112 and 114, respectively. Slide brackets 88 include pillow bearing blocks 116 which freely ride on the slide rails 110 during operation of the transfer bucket conveyor 38. The servo-motor 90 is fixed to a motor mounting plate 118 attached to the rear frame plate 96 via spacers 120 (FIG. 3). In this way, the rigid support frame 86, including the front and rear frame plates 94 and 96, respectively, and floating carriage 80 are vertically spaced above the cartoner bucket conveyor 46.

With further reference to FIGS. 2–4, the upper fill run 48 of product transfer buckets 52 travels between side transfer covers 122 attached to respective front and rear frame plates 94 and 96 via side cover mounts 124. Arcuate turnover guides 126 are provided intermediate the side transfer covers 122 via turnover guide spacers 128 such that the turnover guides 126 cooperate with slots 130 in the product transfer buckets 52 to hold the preselected count stacks 44 within the buckets 52 during a transition from the upper fill run 48 to the lower discharge run 50 about the sprockets 56.

As shown most clearly in FIG. 4, the floating carriage 80 includes the slide brackets 88 attached to fixed bearing plates 132 disposed on either side of sprockets 56. Carriage shaft 82 freely rotates in the fixed bearing plates 132 as sprockets 56 are driven by the endless drive belt 62. Adjustment brackets 134 are attached to the fixed bearing plates 132 via adjustment blocks 136 for varying vertical spacing of the transfer bucket conveyor 38 above the cartoner bucket conveyor 46. As sprockets 56 drive the pair of endless chains 54, chain guides 138 are provided to maintain proper alignment of chains 54 along the length of the floating carriage 80. It will be appreciated that a similar structure is provided with regard to the carriage shaft 84 and sprockets 58.

Figure 5:
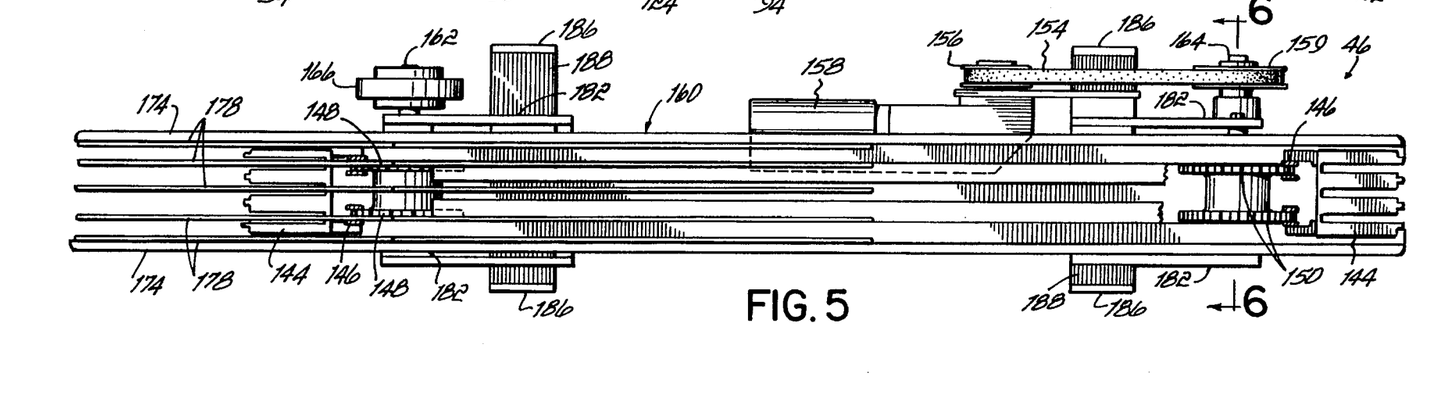
FIG. 5 is a top view of the cartoner bucket conveyor.
Figure 6:
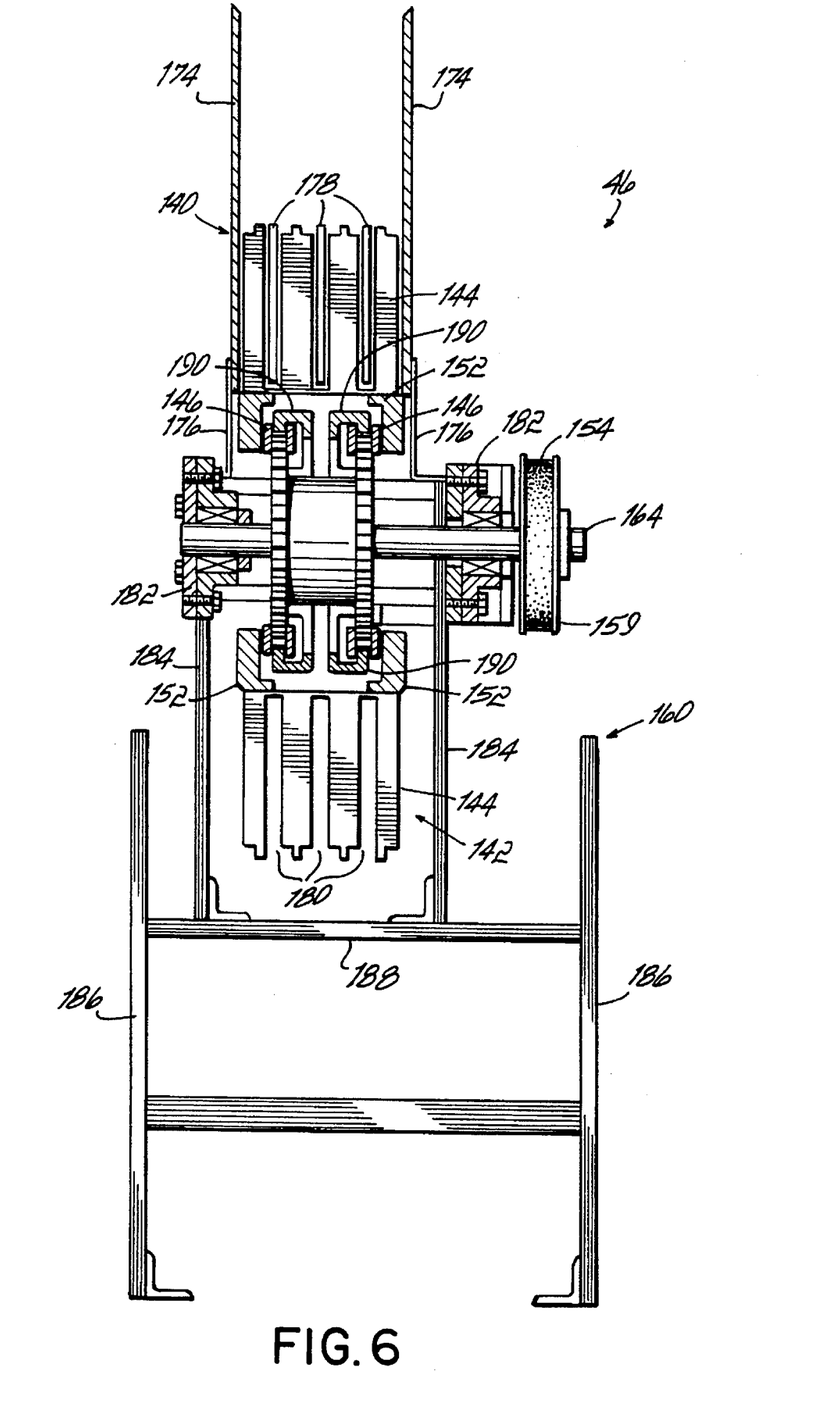
FIG. 6 is a cross-sectional view of the cartoner bucket conveyor taken generally along line 6—6 of FIG. 5.

Turning to FIGS. 2, 5 and 6, the cartoner bucket conveyor 46 includes upper and lower runs 140 and 142, respectively, of slotted cartoner product buckets 144 fixed to and disposed about a pair of endless chains 146. Chains 146 travel in a clockwise direction about endstocks or sprockets 148 and 150, and are driven by sprockets 150. The cartoner product buckets 144 are attached to the pair of endless chains 146 via bucket mounting brackets 152 which mate to lugs (not shown) such that the cartoner product buckets 144 are likewise configurable to match feeding operation of the cartoner machine 36.

In one embodiment, sprockets 150 are driven by an endless driving belt 154 via a driving pulley 156 attached to a servo-motor 158. The driving belt 154 is driven clockwise about a sprocket pulley 159 associated with the sprockets 150 to drive the chains 146. Sprockets 148 and 150 are fixed to a rigid support frame 160 via respective shafts 162 and 164. The power take-off 92 extends from a pulley 166 associated with sprockets 148 (see FIGS. 2 and 5) to a pulley 168 associated with a gear 170 (see FIG. 2). Gear 170 intermeshes with a gear 172 associated with driving pulley 66 of the transfer bucket conveyor 38 (see FIGS. 2 and 4) such that the lower discharge run 50 of product transfer buckets 52 travels in the same direction and at the same rate as the upper run 140 of cartoner product buckets 144.

The upper run 140 of cartoner product buckets 144 travels between side covers 174 attached to the rigid support frame 160 via support flanges 176. Angled ramp bars 178 are provided intermediate the side covers 174 and extend within elongated slots 180 in the cartoner product buckets 144 as the upper run 140 travels about the sprockets 150. In this way, the preselected count stacks 44 are retained in the product transfer buckets 52 via the arcuate turnover guides 126 between the upper fill run 48 and lower discharge run 50 until the stacks 44 travel down the angled ramp bars 178 and into the slotted cartoner product buckets 144.

Of course, in place of the extended, inclined pouch transition mandated by the ramp bars 178, a simple drop off from the abrupt end of a guide 126 on a horizontal ramp bar (not shown) could be used. One or two stage direct drops into the cartoner buckets, with no incline bars 178, could be provided.

Referring further to FIGS. 2, 5 and 6, shaft 164 freely rotates in fixed bearing plates 182 attached to side plates 184 such that the lower discharge run 50 of product transfer buckets 52 and the upper run 140 of cartoner product buckets 144 travel between the side covers 174. It will be appreciated that a similar structure is provided with regard to the shaft 162. The side plates 184 are attached to leg plates 186 via a bottom plate 188 such that the rigid support frame 160 is aligned with and positioned beneath the rigid support frame 86 of the transfer bucket conveyor 38. As the pair of endless chains 146 travel about the sprockets 148 and 150, chain guides 190 are provided to maintain proper alignment of the chains 146. An adjustment block 192 is attached to the bearing plates 182 of shaft 162 to provide tension adjustment for the pair of endless chains 146 as sprockets 148 are laterally adjusted via screw 194.

In operation of the present invention the transfer bucket conveyor 38 travels in a timed relationship with, and in a counterclockwise direction beneath, the rotary feeding station 40 (as shown by directional arrow 196 in FIGS. 2, 2A and 7A–7G). In this way, individual product 42 is deposited into the product transfer buckets 52 in preselected count stacks 44 along the upper fill run 48 of the transfer bucket conveyor 38. The cartoner bucket conveyor 46 travels at the same rate as the lower discharge run 50 of product transfer buckets 52 and in a clockwise direction beneath the transfer bucket conveyor 38 (as shown by directional arrow 198 in FIGS. 2 and 2A). As the upper fill run 48 of filled product transfer buckets 52 travels about the sprockets 56 to the lower discharge run 50, the preselected count stacks 44 are transferred to the upper run 140 of cartoner product buckets 144 via the arcuate turnover guides 126 and angled ramp bars 178 for subsequent discharge at the cartoner machine 36. In one embodiment, the product transfer buckets 52 and the cartoner product buckets 144 include outwardly projecting lips (not shown) along an upper edge of the respective buckets to further facilitate transfer of the stacks 44.

In accordance with the present invention, the transfer bucket conveyor 38 is capable of intermittent or decreased speed in the upper fill run 48 relative to the rotary feeding station 40 for receiving the individual product 42 while maintaining a constant speed through the lower discharge run 50 for discharging the preselected count stacks 44 into the cartoner bucket conveyor 46. The spatial dwell-and-go motion of the upper fill run 48 is accommodated by overdriving or underdriving the upper fill run 48 relative to the lower discharge run 50 via servo-motor 90 and associated driving pulley 64 as will be described in more detail below. As the upper fill run 48 is overdriven or underdriven relative to the lower discharge run 50, the floating carriage 80 moves in laterally opposite directions to provide the spatial dwell-and-go motion of the upper fill run 48 beneath the rotary feeding station 40 to accommodate for rejected product or for varied product counts.

Figure 2A:
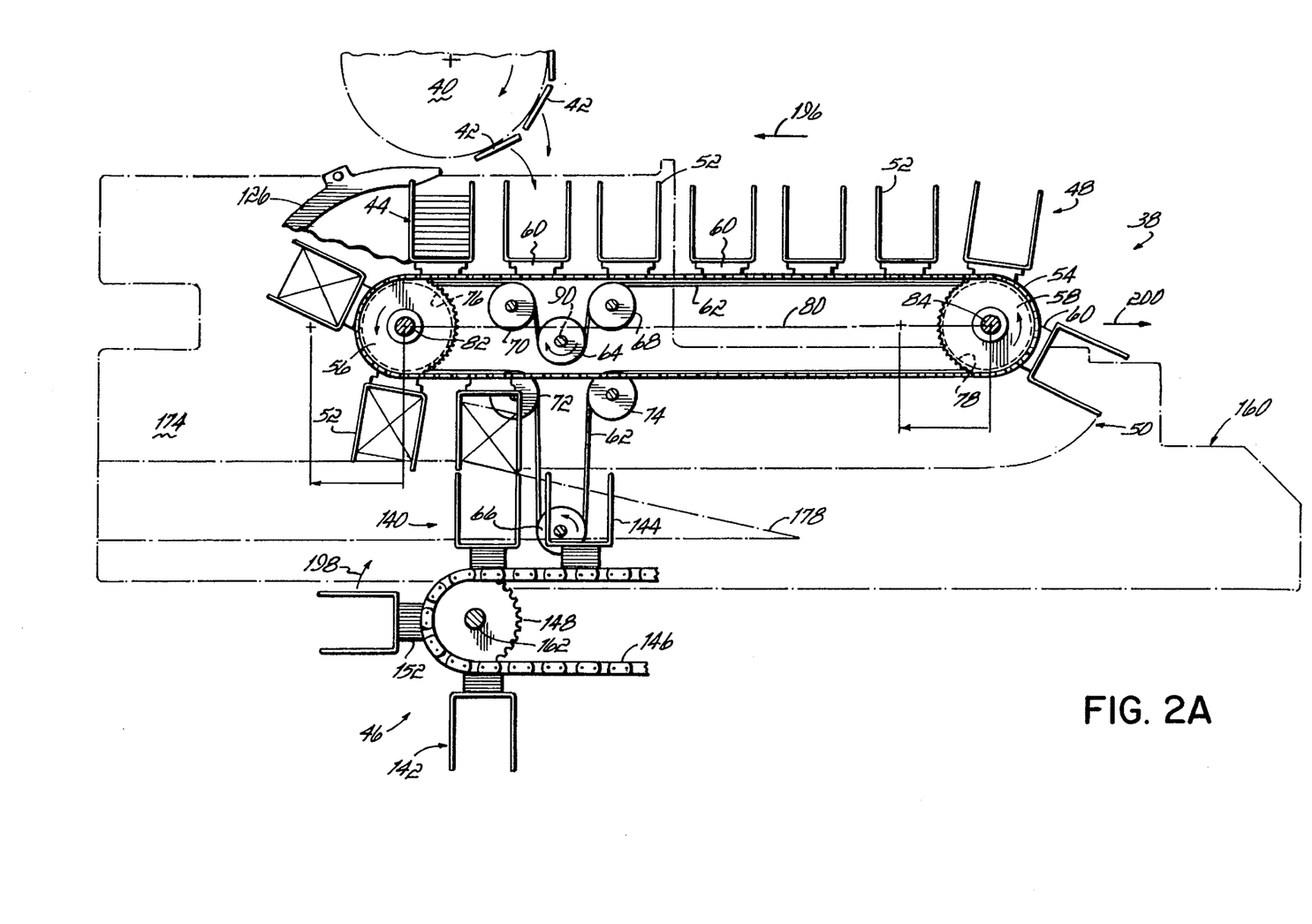
FIG. 2A is a schematic side elevational view similar to FIG. 2 showing the transfer bucket conveyor shifted laterally in an opposite direction, such as to the right as shown in the figure.

Referring to FIGS. 2 and 2A, as the upper fill run 48 travels at the same rate as the lower discharge run 50, that is, the rotational speed of fixed driving pulley 64 matches the rotational speed of fixed driving pulley 66, the floating carriage 80 assumes a rest position as shown in FIG. 2. As the upper fill run 48 is underdriven relative to the lower discharge run 50 via servo-motor 90, that is, the rotational speed of driving pulley 64 is less than that of the driving pulley 66, a force will be applied to the floating carriage 80 by this speed differential to move the carriage 80 laterally to the right to assume a shifted position as shown in FIG. 2A. The shifting of the floating carriage 80 in opposite directions is provided solely by lateral forces alternately applied to the sprocket pulleys 76 and 78 and, thus, respective sprockets 56 and 58, via the endless drive belt 62.

For example, when the rotational speed of fixed driving pulley 64 is less than that of fixed driving pulley 66, the drive belt 62 will be shortened about the sprocket pulley 76 and lengthened about the sprocket pulley 78. To accommodate for this take-up of the drive belt 62 about sprocket pulley 76, the drive belt 62 inherently applies a lateral force to the sprocket pulley 76, thus forcing the floating carriage 80 to move laterally to the right along slide rails 110, as shown by directional arrow 200 in FIGS. 2A, 7C and 7D.

Conversely, when the rotational speed of fixed driving pulley 64 is greater than that of fixed driving pulley 66, a resultant force will be applied by the drive belt 62 to move carriage 80 to the left as viewed in the figures as the drive belt 62 is shortened about the sprocket pulley 78 and lengthened about the sprocket pulley 76. Drive belt 62 will thus apply a lateral force to the sprocket pulley 78 forcing the floating carriage 80 to move laterally to the left as shown by directional arrow 202 in FIGS. 7E and 7F. Accordingly, the lateral movement of transfer bucket conveyor 38 and, thus, the spatial dwell-and-go motion of the upper fill run 48 beneath the feeding station 40, is provided by varying the rotational speed of the fixed driving pulley 64 relative to the constant rotational speed of fixed driving pulley 66. It will be appreciated that the lower discharge run 50 of product transfer buckets 52 travels at the same rate and in the same direction as the upper run 140 of cartoner product buckets 144 to provide a coordinated transfer of the preselected count stacks 44.

With reference to FIGS. 7A–7G, operation of the direct drop transfer apparatus 34 in accordance with the present invention is shown. As the rotary feeding station 40 rejects one or more pouches 32 due to improper product fill, as detected by a β-ray detector 204 upstream of the rotary knife station 30, or by any other suitable detector or signal generator, the transfer bucket conveyor 38 operates in a spatial dwell-and-go motion to obtain the preselected count stacks 44 of pouches 32 in the product transfer buckets 52a–52c. The spatial dwell-and-go operation of the transfer bucket conveyor 38 and, more particularly, the upper run 48 of product transfer buckets 52a–52c is preferably governed by the following relationship:

$$V_2 = V_1 - 2(V_3)$$

where $V_2$=velocity of the product transfer buckets 52 along the upper fill run 48; $V_1$=velocity of the product transfer buckets 52 along the lower discharge run 50; and $V_3$=velocity of the floating carriage 80 ($V_1$, $V_2$ and $V_3$ being relative to the rotary feeding station 40 with positive velocities as shown in the figures).

It should be appreciated here that $V_3$, i.e., the velocity of the floating carriage, is always a result of the conditions, forces or parameters acting on the conveyor, for example, and does not itself constitute a control input. $V_3$, however, is discussed herein for clarity to show the carriage velocity which results from the other operational features of the invention.

Figure 7A:
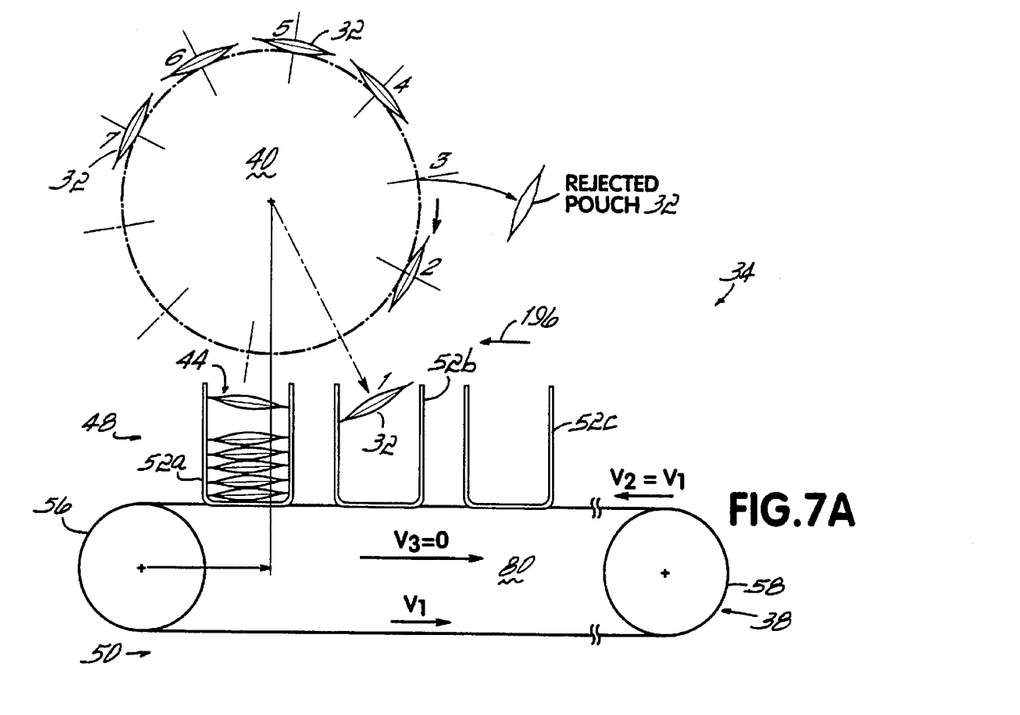
FIGS. 7A–7G are diagrammatic views showing operation of the transfer bucket conveyor in accordance with the present invention.
Figure 7B:
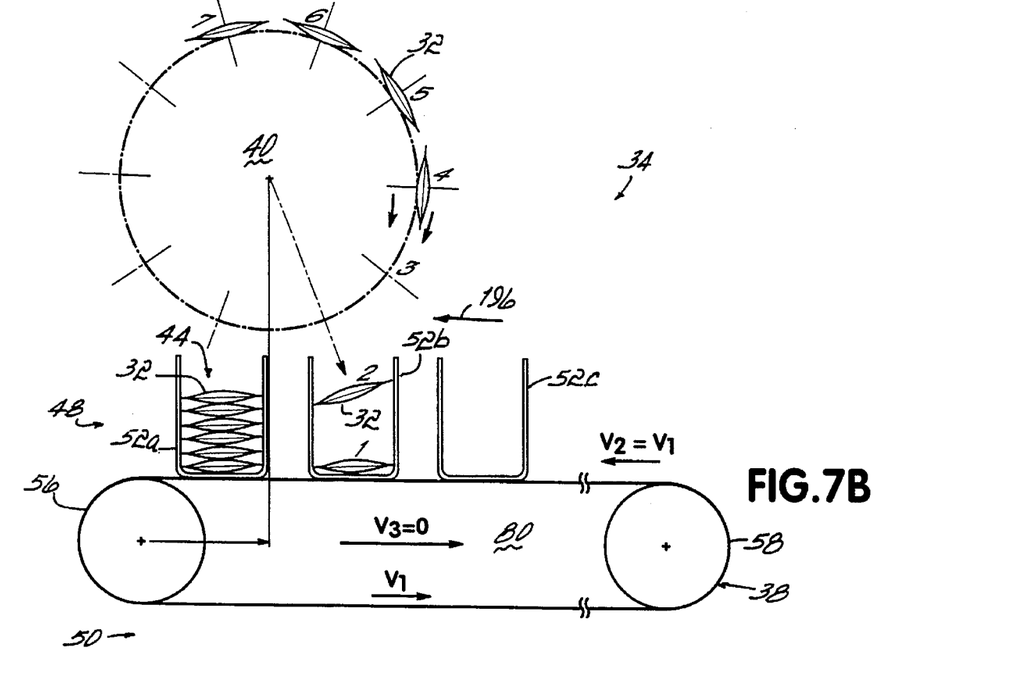

Referring to FIGS. 7A and 7B, during normal operation of the transfer bucket conveyor 38 the floating carriage 80 is static, i.e., in a rest position, relative to the rotary feeding station 40 (i.e., $V_3$=0) and the upper run 48 travels at the same velocity (opposite direction) as the lower run 50 (i.e., $V_2$=$V_1$). This is accomplished by matching the rotational speed of the fixed driving pulley 64 to that of the fixed driving pulley 66. In this way, the rotary feeding station 40 deposits the individual pouches 32 into the product transfer buckets 52 in preselected count stacks 44, with a six count pouch stack being shown in leading bucket 52a in the figures. It will be appreciated that $V_1$ is variable relative to the rotary feeding station 40 to accommodate for different pouch production rates but $V_1$ is constant for a given pouch production rate to match operation of the cartoner machine 36.

Figure 7C:
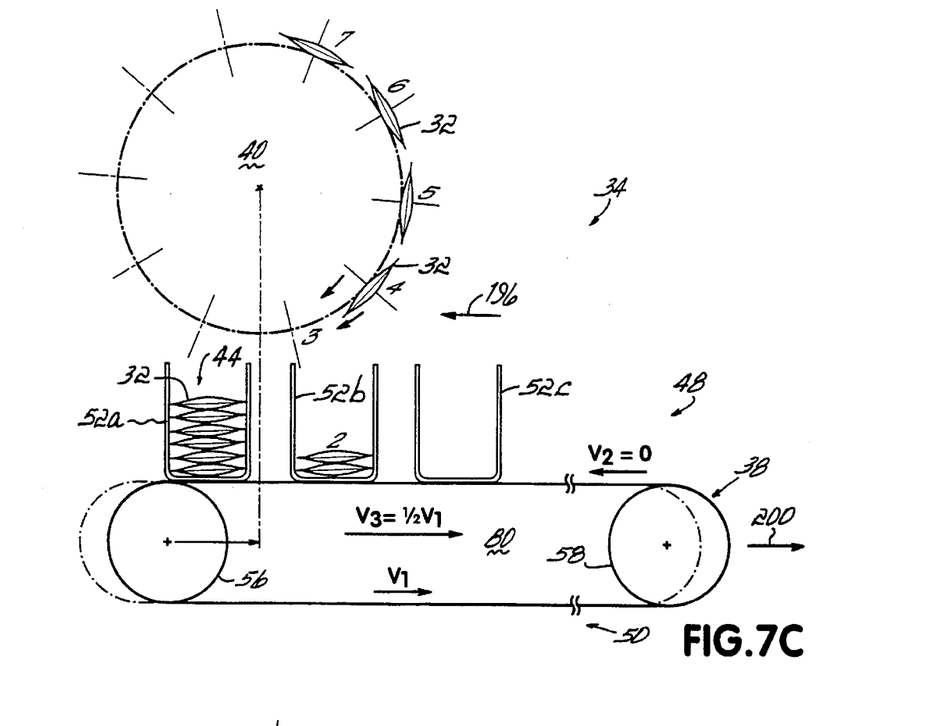
Figure 7D:
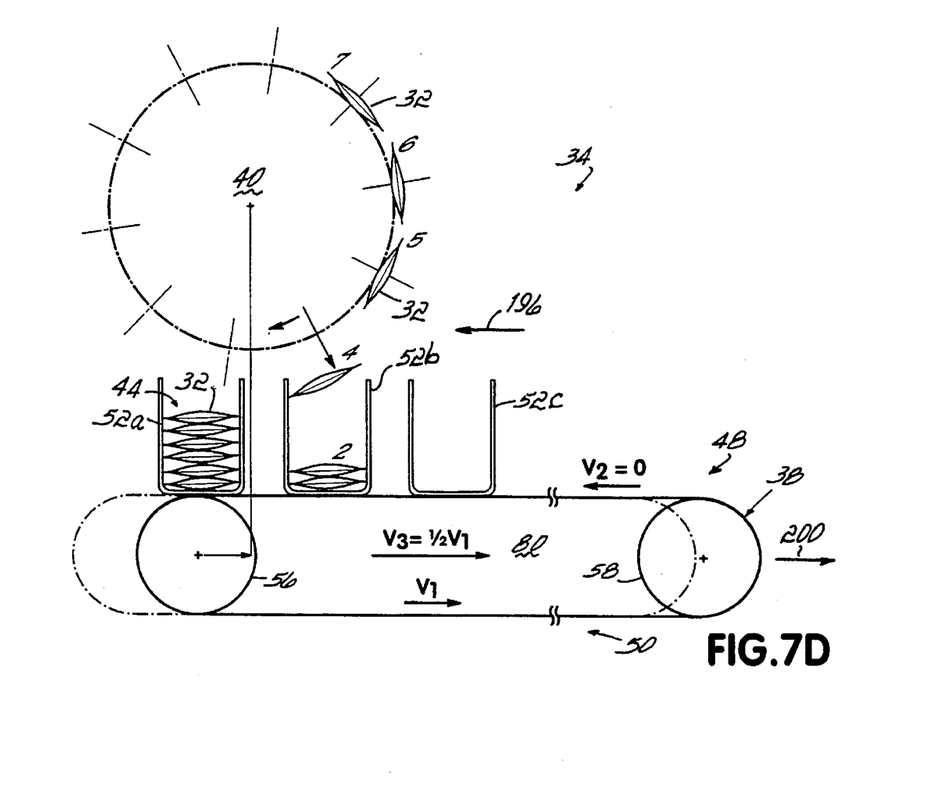

When the β-ray detector 204 detects that a pouch 32 is defective, an appropriate signal is sent from the control panel 37 to the rotary feeding station 40. Upon receipt of the signal, the rotary feeding station 40 rejects the defective pouch 32, such as the pouch labeled "3" as shown in FIGS. 7A–7G. To accommodate for the rejected pouch 32, the upper fill run 48 must dwell beneath the rotary feeding station 40 to permit another following pouch 32 to catch up to the respective "light" bucket (bucket 52b in the figures). The dwell operation, as shown in FIGS. 7C and 7D, is provided by appropriately underdriving the upper fill run 48 relative to the lower discharge run 50, i.e., by lowering the rotational speed of fixed driving pulley 64 below that of driving pulley 66, such that the floating carriage 80 moves laterally to the right (as shown by directional arrow 200 in the figures). As the floating carriage 80 is caused to move laterally to the right at one-half the velocity of the lower discharge run 50 (i.e., resulting $V_3$=½$V_1$), the upper fill run 48 becomes static relative to the rotary feeding station 40 (i.e., $V_2$=0). The upper fill run 48 remains static in this fashion until the transfer bucket conveyor 38 has accommodated for the rejected pouch 32, such as shown in FIG. 7D, where the pouch labeled "4" has caught up to the temporarily "light" bucket 52b and replaces the rejected pouch labeled "3" to maintain the preselected count within the product transfer bucket 52b.

Figure 7E:
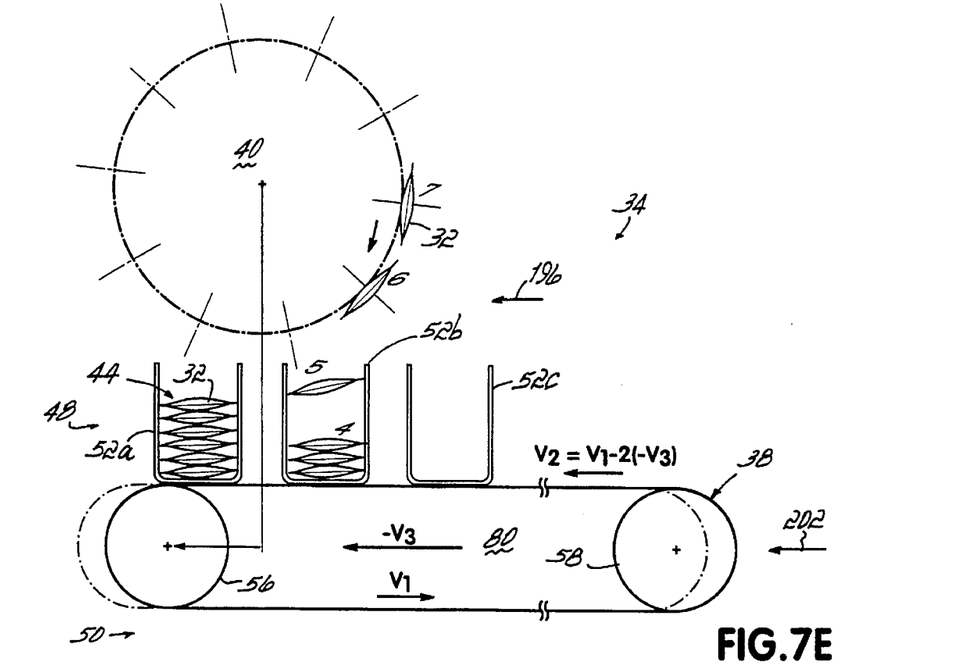
Figure 7F:
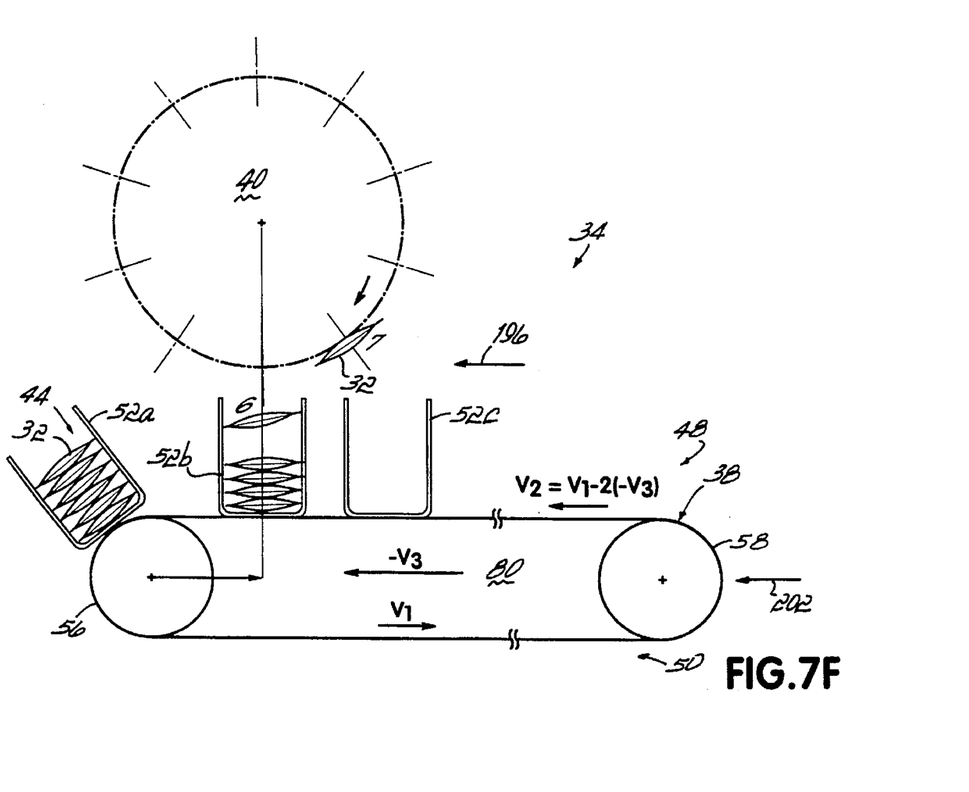
Figure 7G:
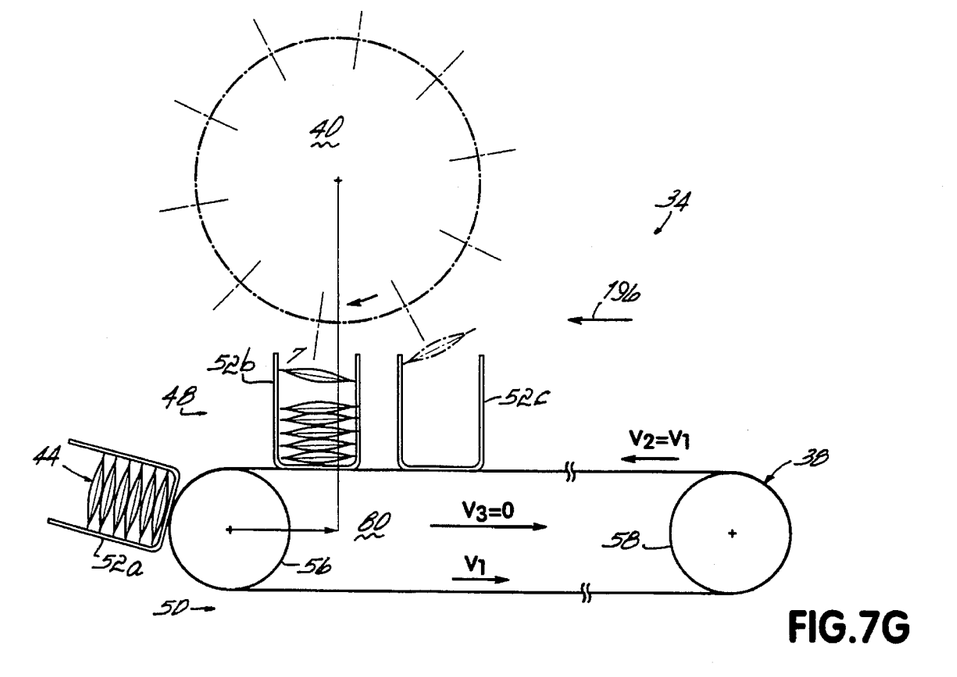

Referring to FIGS. 7E and 7F, after the transfer bucket conveyor 38 has accommodated for the rejected pouch 32 via the dwell operation, the upper fill run 48 is overdriven relative to the lower discharge run 50, i.e., the rotational speed of the fixed driving pulley 64 is raised above that of driving pulley 66 such that the floating carriage 80 is now caused to move laterally to the left (as shown by directional arrow 202 in the figures) and back to the rest position as shown in FIG. 7G. In this way, the upper run 48 is accelerated (i.e., to $V_2$=$V_1$−2(−$V_3$)) such that the system of product transfer buckets 52 resumes its proper zero or starting orientation relative to the rotary feeding station 40 to receive the pouches 32 in the preselected count stacks 44. It will be appreciated that the rotary knife station 40 must be "sped-up" to maintain proper registration with the "return speed" of the product transfer buckets 52 as the floating carriage 80 moves from the shifted position shown in FIG. 7D to the rest position shown in FIG. 7G.

It will also be appreciated that in an alternate embodiment, alternate operational logic could be used to cause a cartoner bucket to be "skipped" in response to a desired or detected circumstance. In this case, use of an abrupt drop off as opposed to the inclined ramp drop off ramps 178, is preferred.

The amount of lateral travel distance available for the floating carriage 80 is fixed, with the maximum amount of travel being dependent upon the frequency of rejected pouches which must be accommodated. For example, in one embodiment the maximum travel distance of floating carriage 80 equals the spacing between centerlines of adjacent product transfer buckets 52. It will be appreciated that the spatial dwell-and-go motion of the transfer bucket conveyor 38 provided by the travel of floating carriage 80 and the variable speed of the upper fill run 48 thus provides a product stacking and conveying control which is heretofore unknown in the prior art.

From the above disclosure of the general principles of the present invention and the preceding detailed description of the preferred embodiments, those skilled in the art will readily comprehend the various modifications to which the present invention is susceptible. Therefore, Applicant desires to be limited only by the scope of the claims and equivalents thereof.

What is claimed is:

1. A product transfer apparatus for receiving individual product in preselected count stacks directly from a rotary feeding station and for discharging said product stacks into a cartoner bucket conveyor, said product transfer apparatus comprising:

a transfer bucket conveyor disposed beneath said rotary feeding station and having a series of product transfer buckets for receiving said product in said stacks directly from said rotary feeding station, each of said product transfer buckets receiving said individual product at more than one discrete location relative to said rotary feeding station, said cartoner bucket conveyor being disposed beneath said transfer bucket conveyor and having a series of cartoner product buckets operating in speed register with a discharge run of said transfer bucket conveyor whereby said product is transferred in said preselected count stacks from said discharge run to said cartoner product buckets for subsequent discharge at a cartoner machine.

2. The product transfer apparatus of claim 1 wherein said rotary feeding station comprises a rotary knife, said rotary knife selectively dropping individually cut pouches in said product transfer buckets in said preselected count stacks.

3. The product transfer apparatus of claim 1 wherein said transfer bucket conveyor comprises a pair of endless chains, said series of product transfer buckets being mounted on said pair of endless chains and extending outwardly therefrom for receiving said product stacks from said rotary feeding station.

4. The product transfer apparatus of claim 3 wherein said cartoner bucket conveyor comprises a pair of endless chains, said series of cartoner product buckets being mounted on said pair of endless chains and extending outwardly therefrom for receiving said product stacks from said discharge run of said transfer bucket conveyor in speed register.

5. The product transfer apparatus of claim 3 wherein said pair of endless chains are driven by first and second sprockets, said first and second sprockets having respective first and second shafts connected to each other by a floating carriage for maintaining spatial distance between said first and second shafts.

6. The product transfer apparatus of claim 5 wherein said first and second sprockets are driven by a closed loop flexible drive, said closed loop flexible drive being driven by first and second driving pulleys.

7. The product transfer apparatus of claim 6 wherein said floating carriage is moveable laterally relative to said rotary feeding station and said cartoner bucket conveyor by way of said first driving pulley being selectively overdriven and underdriven relative to said second driving pulley whereby a fill run of said transfer bucket conveyor is moveable in a series of accelerate and decelerate cycles for accommodating rejection of said product or for varying counts of said product in said fill run while maintaining constant motion of said discharge run in speed register with said cartoner bucket conveyor.

8. Product transfer apparatus for receiving individual product in preselected count product stacks directly from a product feeding station and for dropping said stacks into a cartoner conveyor therebeneath operating at a selected speed, said product transfer apparatus comprising:

a product transfer conveyor having an upper fill run for receiving said stacks directly from said feeding station and a lower discharge run for dropping said stacks onto said cartoner conveyor, said product transfer conveyor being disposed beneath said product feeding station and above said cartoner conveyor, said lower discharge run operating at the selected speed of said cartoner conveyor.

9. The product transfer apparatus of claim 8 wherein said upper fill run is moveable in a series of accelerate and decelerate cycles to accommodate receipt of said product stacks on discrete locations thereof, said lower discharge run operating at the selected speed of said cartoner conveyor to continuously feed said product stacks from said lower discharge run to said cartoner conveyor for subsequent discharge at a cartoner machine.

10. A pouch handling system for transferring pouches in preselected count stacks from a pouch feeding station to a cartoner bucket conveyor operating at a selected speed, said pouch handling system comprising:

a transfer conveyor having an endless bucket conveyor defining upper and lower conveying runs of buckets between conveyor end stocks;

a floating carriage supporting said end stocks;

an endless flexible drive belt operably driving said end stocks;

an upper drive operably connected to said drive belt; and a lower drive operably connected to said drive belt;

one of said drives being operably driven at the selected speed of said cartoner bucket conveyor and the other of said drives being connected to a drive motor for selectively underdriving and overdriving said other drive relative to said one drive, said drives respectively driving said lower run at a constant speed in register with the selected speed of said cartoner bucket conveyor while accommodating speed changes in said upper run to maintain said preselected count in said stacks.

11. The pouch handling system of claim 10 wherein said floating carriage is moveable laterally relative to said pouch feeding station and said cartoner bucket conveyor by way of said upper drive being selectively overdriven and underdriven relative to said lower drive whereby said upper conveying run of buckets is moveable in a series of accelerate and decelerate cycles for accommodating rejection of said pouches or for varying counts of pouches in said stacks while maintaining constant motion of said lower run in speed register with said cartoner bucket conveyor.

12. In a pouch manufacturing and packaging line, the combination of:

a pouch drop-off knife;

a transfer conveyor; and a cartoner bucket conveyor;

said transfer conveyor being disposed beneath said knife and above said cartoner bucket conveyor;

said transfer conveyor having an upper fill run for receiving pouches from said knife in stacks and a lower discharge run for dropping pouch stacks onto said cartoner bucket conveyor;

said upper fill run being moveable in timed speed register with said knife for receiving said pouches in selected stack count from said knife;

wherein the speed of said upper fill run is variable from the speed of said lower discharge run to accommodate pouches rejected off said knife and not deposited on said transfer conveyor.

13. The combination of claim 12 further including:

said transfer conveyor having an endless bucket conveyor defining said upper and lower runs between conveyor end stocks;

a floating carriage supporting said end stocks;

an endless flexible drive belt operably driving said end stocks;

an upper drive operably connected to said drive belt; and a lower drive operably connected to said drive belt;

one of said drives being slaved in speed register with said cartoner bucket conveyor and the other of said drives being connected to a drive motor for selectively underdriving and overdriving said other drive, said drives respectively driving said lower discharge run at a constant speed in speed register with said cartoner bucket conveyor while accommodating speed changes in said upper run to maintain said selected stack count of said individual pouches.

14. The combination of claim 13 wherein said floating carriage is moveable laterally relative to said pouch drop-off knife and said cartoner bucket conveyor by way of said upper drive being selectively overdriven and underdriven relative to said lower drive whereby said upper fill run is moveable in a series of accelerate and decelerate cycles for accommodating rejection of said pouches or for varying counts of pouches in said stacks while maintaining constant motion of said lower discharge run in speed register with said cartoner bucket conveyor.

15. A method of building and transferring stacks of pouches received from a cut-off knife having a plurality of individual knife stations directly into buckets of a cartoner bucket conveyor, the method comprising the steps of:

dropping individual pouches into stacks in respective buckets along an upper fill run of a transfer conveyor;

dropping said pouch stacks from said buckets of said transfer conveyor along a lower discharge run thereof directly into respectively registered buckets of said cartoner bucket conveyor operating at a constant speed; and varying the speed of said upper fill run in response to rejection of a pouch by one of said knife stations while maintaining register of said buckets along said lower discharge run with said buckets of said cartoner bucket conveyor.

16. The method as in claim 15 including the step of shifting said transfer bucket conveyor laterally beneath said knife to produce said speed variation.

17. In a product packaging line, a method of transferring product from a feed station to a cartoner bucket conveyor including the steps of:

dropping said product directly from said feed station onto an upper fill run of a transfer conveyor;

building discrete stacks of said product on said upper fill run;

conveying said product stacks to a lower discharge run of said transfer conveyor; and dropping said product stacks from said lower run directly into buckets of a cartoner bucket conveyor.

18. A method as in claim 17 wherein said method includes receiving pouches in preselected count stacks on said transfer conveyor and dropping said stacks into said buckets of said cartoner bucket conveyor.

19. A product transfer apparatus for receiving individual product in preselected count stacks directly from a feeding station and for discharging said product stacks onto a product conveyor, said product transfer apparatus comprising:

a transfer bucket conveyor disposed beneath said feeding station and having a series of product transfer buckets for receiving said product in said stacks directly from said feeding station, said product conveyor being disposed beneath said transfer bucket conveyor and operating in speed register with a discharge run of said transfer bucket conveyor whereby said product is transferred in said preselected count stacks from said discharge run to said product conveyor for subsequent discharge.

20. Product transfer apparatus for receiving individual product in preselected count product stacks directly from a product feeding station and for dropping said stacks onto a product conveyor therebeneath operating at a selected speed, said product transfer apparatus comprising:

a product transfer conveyor having an upper fill run for receiving said stacks directly from said feeding station and a lower discharge run for dropping said stacks onto said product conveyor, said transfer conveyor being disposed beneath said product feeding station and above said product conveyor, said lower discharge run operating at the selected speed of said product conveyor.

21. A pouch handling system for transferring pouches in preselected count stacks from a pouch feeding station to a product conveyor operating at a selected speed, said pouch handling system comprising:

a transfer conveyor having an endless bucket conveyor defining upper and lower conveying runs of buckets between conveyor end stocks;

a floating carriage supporting said end stocks;

an endless flexible drive belt operably driving said end stocks;

an upper drive operably connected to said drive belt; and a lower drive operably connected to said drive belt;

one of said drives being operably driven at the selected speed of said product conveyor and the other of said drives being connected to a drive motor for selectively underdriving and overdriving said other drive relative to said one drive, said drives respectively driving said lower run at a constant speed in register with the selected speed of said product conveyor while accommodating speed changes in said upper run to maintain said preselected count in said stacks.

22. In a pouch manufacturing and packaging line, the combination of:

a pouch drop-off knife;

a transfer conveyor; and a pouch conveyor;

said transfer conveyor being disposed beneath said knife and above said pouch conveyor;

said transfer conveyor having an upper fill run for receiving pouches from said knife in stacks and a lower discharge run for dropping pouch stacks onto said pouch conveyor;

said upper fill run being moveable in timed speed register with said knife for receiving said pouches in selected stack count from said knife;

wherein the speed of said upper fill run is variable from the speed of said lower discharge run to accommodate pouches rejected off said knife and not deposited on said transfer conveyor.

23. A method of building and transferring stacks of pouches received from a cut-off knife having a plurality of individual knife stations directly onto a pouch conveyor, the method comprising the steps of:

dropping individual pouches into stacks in respective buckets along an upper fill run of a transfer conveyor;

dropping said pouch stacks from said buckets along a lower discharge run of said transfer conveyor directly onto selected positions of said pouch conveyor operating at a constant speed; and varying the speed of said upper fill run in response to rejection of a pouch by one of said knife stations while maintaining register of said buckets along said lower discharge run with said selected positions of said pouch conveyor.

24. In a product packaging line, a method of transferring product from a feed station to a product conveyor including the steps of:

dropping said product directly from said feed station onto an upper fill run of a transfer conveyor;

building discrete stacks of said product on said upper fill run;

conveying said product stacks to a lower discharge run of said transfer conveyor; and dropping said product stacks from said lower run directly onto a product conveyor.

\* \* \* \* \*